United States Patent [19]
Leavitt et al.

[11] Patent Number: 6,028,410
[45] Date of Patent: Feb. 22, 2000

[54] RESONANCE DETECTION AND RESOLUTION

[75] Inventors: Paul J. Leavitt, Minneapolis; James W. Comb, Hamel; Edward Rapoport, Minneapolis, all of Minn.

[73] Assignee: Stratasys, Inc., Eden Prairie, Minn.

[21] Appl. No.: 09/228,312

[22] Filed: Jan. 11, 1999

[51] Int. Cl.$^7$ .......................... G06F 15/46; G05B 19/42
[52] U.S. Cl. .................. 318/568.15; 318/568.18; 318/573; 395/85; 395/87; 395/80; 382/263; 382/236
[58] Field of Search .................. 318/560–696; 395/80–96; 364/167.01, 174, 148, 176, 152, 153; 382/243, 236, 232, 235, 238

[56] References Cited

U.S. PATENT DOCUMENTS

| | | | |
|---|---|---|---|
| 4,488,242 | 12/1984 | Tabata et al. | 364/513 |
| 4,769,583 | 9/1988 | Goor | 318/568 |
| 4,843,287 | 6/1989 | Taft | 318/568.16 |
| 4,990,838 | 2/1991 | Kawato et al. | 318/568.1 |
| 5,121,329 | 6/1992 | Crump | 364/468 |
| 5,179,514 | 1/1993 | Rastegar et al. | 364/167 |
| 5,303,141 | 4/1994 | Batchelder et al. | 364/149 |
| 5,340,433 | 8/1994 | Crump | 156/578 |
| 5,402,351 | 3/1995 | Batchelder et al. | 364/468 |
| 5,426,722 | 6/1995 | Batchelder | 395/80 |
| 5,503,785 | 4/1996 | Crump et al. | 364/40.7 |
| 5,587,913 | 12/1996 | Abrams et al. | 364/468.26 |
| 5,638,267 | 6/1997 | Singhose et al. | 364/148 |
| 5,799,109 | 8/1998 | Chung et al. | 382/243 |
| 5,854,450 | 12/1998 | Kent | 178/18.04 |

*Primary Examiner*—Paul Ip
*Attorney, Agent, or Firm*—Kinney & Lange, P.A.

[57] ABSTRACT

The present invention provides a method for controlling following error in a robotic system that moves a tool at a velocity along a path defined by an inputted set of vertices. The following error is controlled to be less than a tolerable error allowance. First, a subset of resonant vertices is identified from the inputted set of vertices. Each of the resonant vertices has a neighboring vertex for which a following error that results when the tool negotiates both the vertex and its neighboring vertex at an assigned vertex velocity might exceed the tolerable error allowance. Second, each vertex in the subset of resonant vertices is assigned a reduced vertex velocity. The reduced vertex velocity is selected so that the following error that results when the tool negotiates both the vertex and its neighboring vertex at the reduced velocities is less than the tolerable error allowance.

23 Claims, 3 Drawing Sheets

RESONANCE DETECTION AND RESOLUTION

CROSS-REFERENCE TO RELATED APPLICATION(S)

None.

BACKGROUND OF THE INVENTION

The present invention relates generally to the field of robotic control systems. In particular, the present invention relates to the detection and resolution of resonance in a robotic system.

One useful application for resonance detection and resolution is in rapid prototyping of models or objects. A rapid prototyping system involves the making of three-dimensional objects based upon design data provided from a computer aided design (CAD) system. Examples of apparatus and methods for rapid prototyping of three-dimensional objects by depositing layers of solidifying material are described in Crump U.S. Pat. No. 5,121,329, Batchelder et al. U.S. Pat. No. 5,303,141, Crump U.S. Pat. No. 5,340,433, Batchelder U.S. Pat. No. 5,402,351, Batchelder U.S. Pat. No. 5,426,722, Crump et al. U.S. Pat. No. 5,503,785, and Abrams et al. U.S. Pat. No. 5,587,913, all of which are assigned to Stratasys, Inc., all of which are hereby incorporated by reference as if set forth fully herein.

A robotic system includes a move-compiler, a motor-controller, a tool, and a plurality of motors, such that the number of motors equals the number of axes in the robotic system. The controller has a plurality of outputs to connect to each of the plurality of motors. Each of the plurality of motors responds to an input from the controller by causing the tool to be translated or controllably positioned in a particular direction. The motors can be one of several different types of motors, such as a rotary or a linear step-type motor (i.e., a stepper or hybrid-stepper motor) or a DC servo motor.

The move-compiler receives, as an input, a list of vertices defining a complex path for the tool to navigate. The move-compiler uses feed-forward algorithms to establish velocities at which the controller may move the tool along the path and then outputs the vertex list and associated velocities to the controller. To then cause the tool to navigate the inputted path, the controller selectively outputs control signals to the motors. The vertex list, which generally consists of a series of vertices that, in turn, define a series of straight lines segments from one vertex to the next, is typically generated by a source, such as an interactive computer aided design (CAD) system. Although the present application applies to only vertex lists in which neighboring vertices are connected by straight-line segments, the vertex list may also consist of a series of vertices in which the segments between neighboring vertices are in the form of circular arcs, polynomial functions, splines, or nurbs.

A general goal of the robotic system is to cause the tool to quickly navigate the pre-defined path while keeping any displacement from the path by the tool, or following error, within an allowable error allowance. To accomplish this general goal, the controller must predict situations that may cause displacement of the tool and resolve those situations before they occur. While it more essential to predict these displacement-causing situations in open-loop robotic system, which are ones that does not require the use of positional or other types of feedback to control the positioning of the tool, than in closed-loop robotic systems, the predictions are nonetheless helpful in closed-loop systems, as well, since most closed-loop systems are capable of looking ahead to only a few vertices, while the move-compiler can look thousand of vertices ahead.

A common source of following error results from a change in the tool's momentum when the tool abruptly changes heading at a vertex while being driven from one line segment to the next. This change in momentum causes the tool to vibrate, or ring. Another common source of following error results from resonance that occurs when combined oscillations due to momentum changes at each of a series of vertices approaches a natural frequency of the tool itself. Both of these situations cause the tool to deviate from the predefined path and may cause the following error to exceed the maximum allowable error. There is therefore a need for a method of detecting and resolving this resonance that may result in the following error exceeding the maximum allowable error.

BRIEF SUMMARY OF THE INVENTION

The present invention provides a method for controlling following error in a robotic system that moves a tool at a velocity along a path defined by an inputted set of vertices. The following error is controlled to be less than a tolerable error allowance. First, a subset of resonant vertices is identified from the inputted set of vertices. Each of the resonant vertices has a neighboring vertex for which a following error that results when the tool negotiates both the vertex and its neighboring vertex at an assigned vertex velocity might exceed the tolerable error allowance. Second, each vertex in the subset of resonant vertices is assigned a reduced vertex velocity. The reduced vertex velocity is selected so that the following error that results when the tool negotiates both the vertex and its neighboring vertex at the reduced velocities is less than the tolerable error allowance.

Third, pairs of resonant vertices are identified from the subset of resonant vertices. Each of the identified pairs of resonant vertices has a tool travel time between the pair that is less than a resonance window period when the velocity of the tool is controlled according to a nonresonant velocity profile. Fourth, vertices located between identified pairs of resonant vertices are reclassified as resonant vertices. Finally, the velocity of the tool is controlled according to a resonant velocity profile when the tool travels between the identified pairs of resonant vertices.

In a preferred embodiment, the vertex velocities are initially assigned so that the resultant following error when the tool negotiates the vertex at its assigned vertex velocity is less than the tolerable error allowance.

DETAILED DESCRIPTION OF THE PREFERRED EMBODIMENTS

Figure 1:
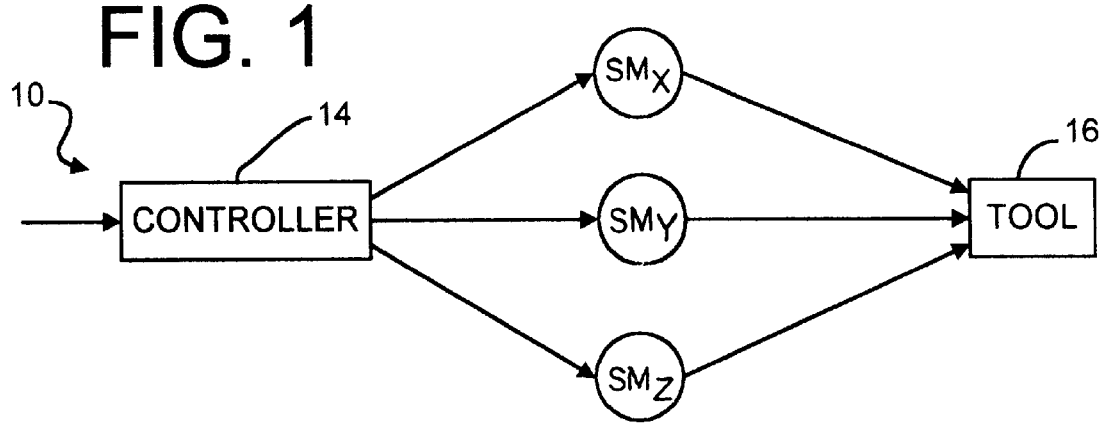
FIG. 1 is a block diagram of a robotic system of the present invention.

FIG. 1 is a block diagram of robotic system 10 of the present invention. Robotic system 10 includes a move-compiler (not shown in FIG. 1), real-time controller 14, X-stepper motor $SM_X$, Y-stepper motor $SM_Y$, Z-stepper motor $SM_Z$, and tool 16.

The move-compiler receives, as an input, a list of vertices (vertex list) defining a complex path that tool 16 must navigate. The vertex list specifies the desired motion of the system by a sequence of vertices, which, in turn, define a sequence of straight line segments from one vertex to the next. The vertex list is provided by a source, such as an interactive computer aided design (CAD) system. The generation of such vertex lists is well known in the art, and will not be described in detail. The move-compiler establishes velocities at which controller 14 may move tool 16 along the inputted path and then outputs the vertex list and associated velocities to controller 14.

To cause tool 16 to navigate the inputted path, controller 14 selectively outputs control signals to X-stepper motor $SM_X$, Y-stepper motor $SM_Y$, or Z-stepper motor $SM_Z$, each of which respond to the inputted pulse by either providing an incremental rotation (step) of a shaft or an incremental linear motion of an actuator element. Each of the stepper motors $SM_X$, $SM_Y$, and $SM_Z$ are mechanically coupled to tool 16 to control its motion in three dimensions. It is noted that each of the stepper motors $SM_X$, $SM_Y$, and $SM_Z$ could be replaced with a different type of motor, such as a DC servo motor.

The following preferred embodiment for the mathematical relationships used in a move compiler to look ahead through a vertex list and assign velocities is particularly effective when the frequency response of the individual axis or degrees of freedom are roughly the same. The subsequent relationships for discerning when one or several adjoining vertices negotiated at assigned velocities can create following errors in excess of a maximum allowable error is applicable to alternative relationships for assigning velocities to a vertex list.

One use of robotic system 10 is as a rapid prototyping system in which tool 16 is an extrusion nozzle coupled to an extrusion pump that provides a source of extrudate, such as a polymer. The end result of the rapid prototyping system is the controlled deposition of beads of extrudate so as to form a three dimensional model of an object of interest. The rapid prototyping system requires a three degree of motion system wherein tool 16 is translated with an x-y-z coordinate reference frame by the action of stepper motors $SM_X$, $SM_Y$, and $SM_Z$. One or more of the stepper motors may be mechanically coupled to a support structure that supports the object during the fabrication thereof.

Another use of robotic system 10 is as a stereolithography prototyping system in which tool 16 comprises a laser or a means for directing a laser beam so as to cure a photopolymer. In addition, robotic system 10 could be a three dimensional prototyping system operating by subtractive methods wherein tool 16 is a device, such as a laser or a nozzle for directing a flow of abrasive material, so as to selectively remove material from a block of material.

In general, the teaching of this invention can be applied with advantage in any robotic system where performance is determined by navigating a complex path precisely and quickly (at non-uniform velocity). Such applications include flatbed and drum plotters, assembly robotics, maze following, glue and caulk applications, manufacturing adhesive dispenser applications, CNC machining, robotic surgery, film patterning, and soldier paste extrusion. The teaching of this invention may also be used, although with less benefit, in applications requiring constant feed rates, such as machining and painting. That is, the teaching of the invention is applicable to applications wherein it is desired to controllably position and/or translate an object along a precise path.

A first goal of robotic system 10 is to move tool 16 along a path defined by the vertex list as quickly as possible. A second goal of robotic system 10 is to keep all displacements from this defined-path bytool 16, or following error, below a tolerable error allowance. To accomplish these general goals of forcing tool 16 to quickly navigate the path while maintaining the following error below the tolerable error allowance, controller 14 must predict situations that may cause displacement of tool 16 to exceed the tolerable error allowance and resolve those situations before they occur.

Figure 2:
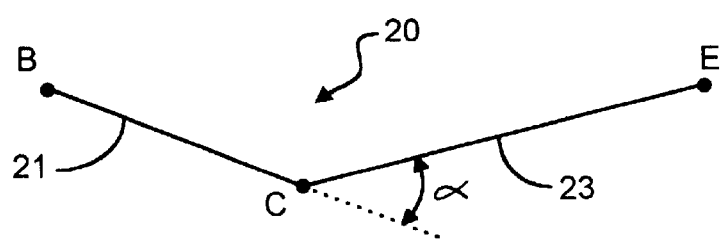
FIG. 2 is a diagram of a pre-defined theoretical path that a tool of the robotic system of the present invention is intended to follow

FIG. 2 is a diagram of pre-defined theoretical path 20 that tool 16 of robotic system 10 of the present invention is intended to follow. Theoretical path 20 is formed by three vertices (begin vertex B, central vertex C, and end vertex E) and two line segments (first and second line segments 21 and 22). First line segment 21 connects begin vertex B and central vertex C, while second line segment 23 connects central vertex C and end vertex E. Controller 14 moves tool 16 from begin vertex B to end vertex E via central vertex C. Path 20 is deflected at vertex C by deflection angle α, which is the angle formed between second line segment 23 and a continuation of first line segment 21. It is noted that a typical path would generally consist of more vertices than are shown in FIG. 2.

Figure 3:
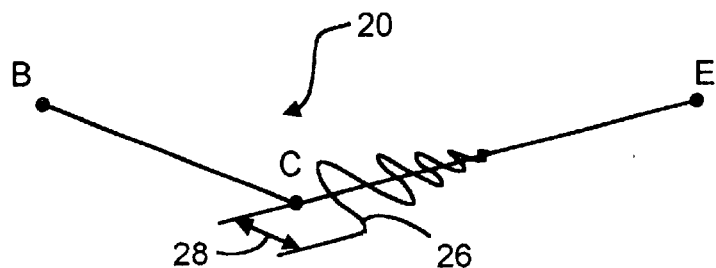
FIG. 3 is a diagram illustrating an oscillatory path actually followed by the tool of the robotic system as the tool oscillates about the predefined path of FIG. 2.

FIG. 3 is a diagram illustrating oscillatory path 26, which is the actual path generally followed by tool 16 as it attempts to follow path 20. Tool 16, when forced to change its heading at central vertex C, does not immediately follow predefined path 20 of FIG. 2; rather, tool 16 initially oscillates about predefined path 20 with maximum overshoot 28, eventually settling on predefined path 20. In FIG. 3, the following error of tool 16 is clearly displayed by the divergence of oscillatory path 26 and path 20.

The oscillations of tool 16, as shown in FIG. 3, maybe caused by a change in momentum of tool 16 when its heading is abruptly changed at central vertex C while it is being driven from first line segment 21 to second line segment 23. The oscillations may also be caused by tool 16 resonating while traveling through the vertices at a frequency that matches a natural frequency ω of tool 16. When tool 16 begins oscillating about its predefined path 20, it is possible that oscillations will become so great as to cause tool 16 to completely stray from predefined path 20 altogether, such that tool 16 fails to get back onto the predefined path.

Figure 5:
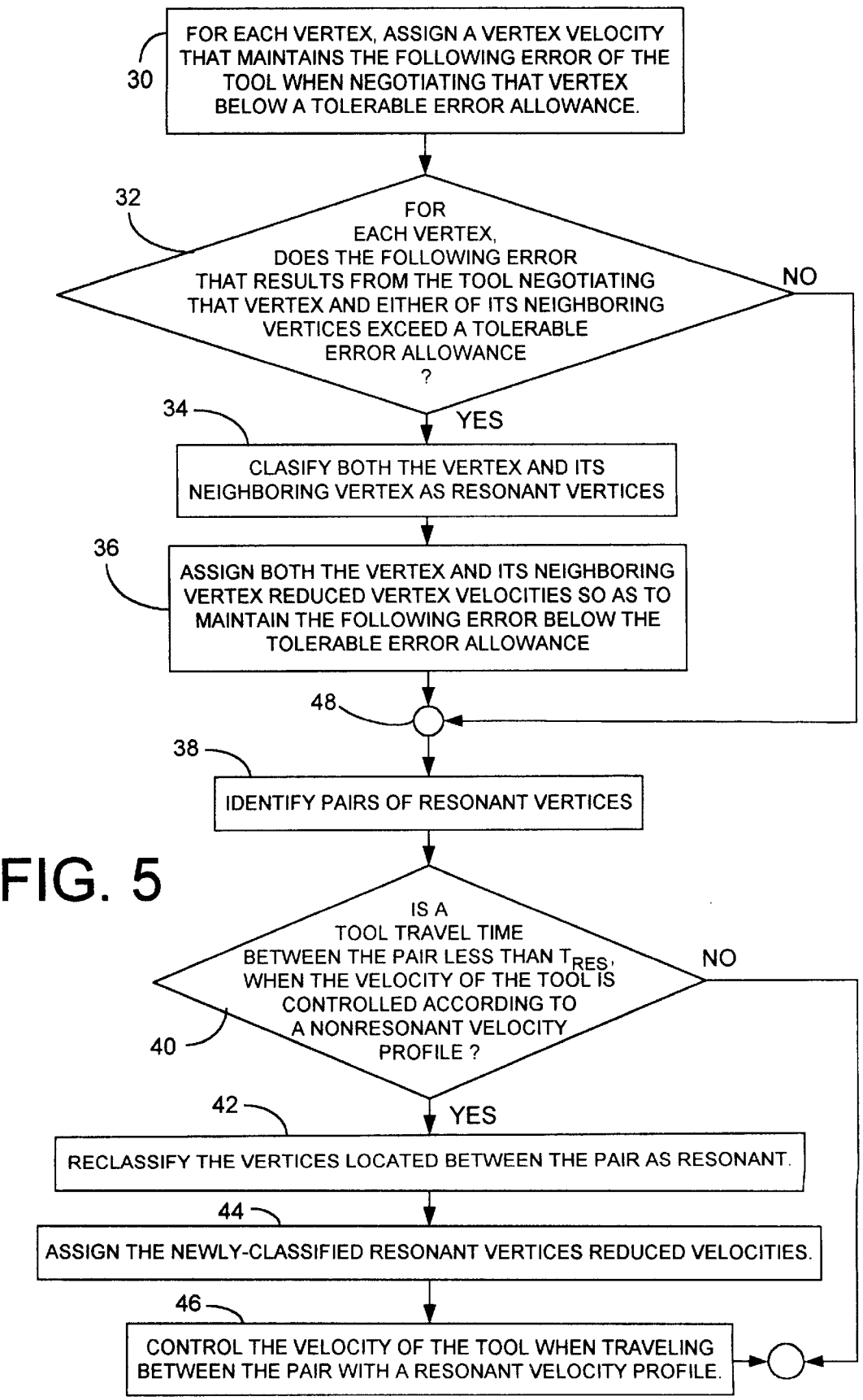
FIG. 5 is a flowchart illustrating a preferred method of the present invention.
Figure 6:
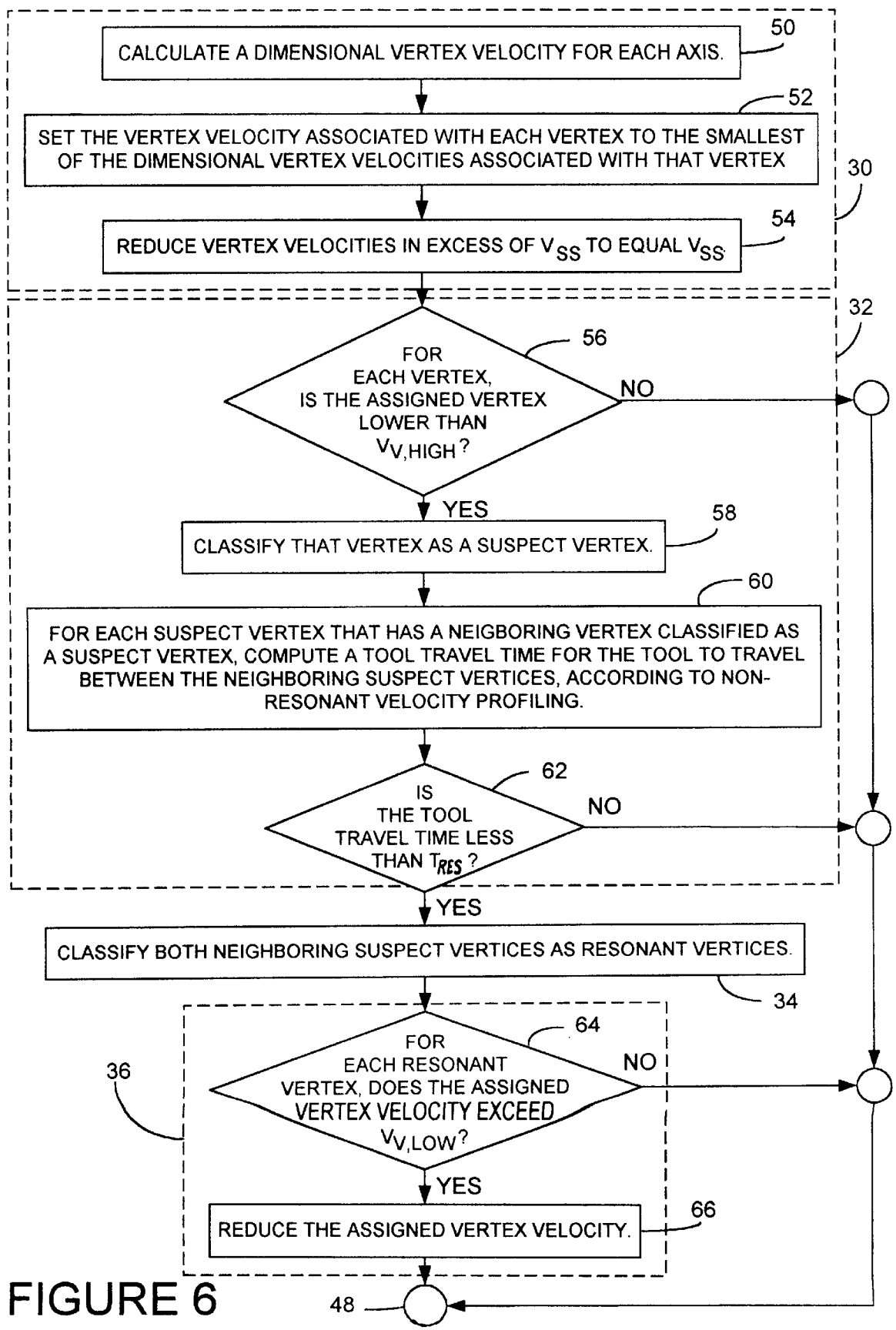
FIG. 6 is a flowchart that further details the preferred method illustrated in FIG. 5.

FIGS. 5 and 6 are flowcharts illustrating a preferred method of the present invention. The method operates to identify vertices that may resonate sufficiently to cause following error of tool 16 about the predefined path to exceed the allowable error.

To prevent the following error that results from a change in momentum due to the heading of tool 16 being abruptly changed at central vertex C from exceeding the tolerable error allowance, the move-compiler computes a vertex velocity $V_V$ for each vertex. (Box 30, FIGS. 5 and 6). This vertex velocity $V_V$ is the maximum velocity at which any of the individual stepper motors $SM_X$, $SM_Y$, or $SM_Z$ can drive tool 16 through that vertex while still containing the following error within a tolerable error allowance $E_A$ (i.e., ensuring that maximum overshoot 28 is less than tolerable error allowance $E_A$).

Vertex velocity $V_V$ is calculated as a function of resonant frequency ω of tool 16, tolerable error allowance $E_A$, and the difference between a unit input vector directed into that vertex and a unit output vector directed out of that vertex. It is noted that for an arbitrary tool 16, the resonant frequencies ($\omega_X$, $\omega_Y$, and $\omega_Z$ in the example of this application) of each axis may differ from each other. Since the three-dimensional motion of tool 16 depends upon the separate operation of stepper motors $SM_X$, $SM_Y$, and $SM_Z$, the vertex velocity is calculated in each dimension. (Box 50, FIG. 6). The overall vertex velocity $V_V$ is then set to the minimum of the vertex velocities calculated in each direction. (Box 52, FIG. 6).

Figure 4:
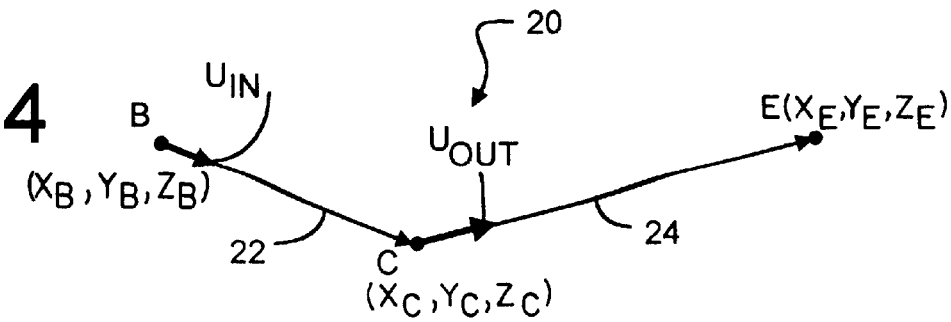
FIG. 4 is a diagram illustrating the input and output velocity vectors that drive the tool of the robotic system along the predefined path of FIG. 2.

To calculate vertex velocity $V_V$ at a particular vertex (e.g., central vertex C), unit input and output vectors $U_{IN}$ and $U_{OUT}$, which are directed into and out of that vertex, must be calculated. FIG. 4 illustrates input and output vectors 22 and 24 along predefined path 20 of FIG. 2. Input vector 22, the vector from begin vertex B ($X_B,Y_B,Z_B$) to central vertex C ($X_C,Y_C,Z_C$) is defined as:

$$(X_C-X_B)\hat{x}+(Y_C-Y_B)\hat{y}+(Z_C-Z_B)\hat{z},$$

while unit input vector $U_{IN}$ is defined as:

$$U_{IN} = \frac{(X_C - X_B)\hat{x} + (Y_C - Y_B)\hat{y} + (Z_C - Z_B)\hat{z}}{\sqrt{(X_C - X_B)^2 + (Y_C - Y_B)^2 + (Z_C - Z_B)^2}},$$

which is input vector 22 divided by the magnitude of input vector 22. Similarly, output vector 24, the vector from central vertex C ($X_C,Y_C,Z_C$) to end vertex E ($X_E,Y_E,Z_E$), is defined as:

$$(X_E-X_C)\hat{x}+(Y_E-Y_C)\hat{y}+(Z_E-Z_C)\hat{z},$$

while unit output vector $U_{OUT}$ is defined as:

$$U_{OUT} = \frac{(X_E - X_C)\hat{x} + (Y_E - Y_C)\hat{y} + (Z_E - Z_C)\hat{z}}{\sqrt{(X_E - X_C)^2 + (Y_E - Y_C)^2 + (Z_E - Z_C)^2}}.$$

Once the unit input and output vectors $U_{IN}$ and $U_{OUT}$ are computed, the maximum vertex velocity in each direction is calculated. The vertex velocity in the X-direction $V_{V,X}$ is calculated as:

$$V_{V,X} = \frac{E_A^* \omega_X}{|\Delta U_X|}.$$

This is the product of tolerable error allowance $E_A$ and x-axis resonant frequency $\omega_X$ of tool 16 divided by the difference in X-components of the unit input and output vectors $U_{IN}$ and $U_{OUT}$. The difference $\Delta U_X$ is defined as:

$$\Delta U_X = \frac{(X_E - X_C)}{\sqrt{(X_E - X_C)^2 + (Y_E - Y_C)^2 + (Z_E - Z_C)^2}} - \frac{(X_C - X_B)}{\sqrt{(X_C - X_B)^2 + (Y_C - Y_B)^2 + (Z_C - Z_B)^2}}.$$

Similarly, the vertex velocity in the Y-direction $V_{V,Y}$ is calculated as $$V_{V,Y} = \frac{E_A^* \omega_Y}{|\Delta U_Y|},$$

where $\omega_Y$ is the y-axis resonant frequency and the difference $\Delta U_Y$ is defined as:

$$\Delta U_Y = \frac{Y_E - Y_C}{\sqrt{(X_E - X_C)^2 + (Y_E - Y_C)^2 + (Z_E - Z_C)^2}} - \frac{(Y_C - Y_B)}{\sqrt{(X_C - X_B)^2 + (Y_C - Y_B)^2 + (Z_C - Z_B)^2}}.$$

Likewise, the vertex velocity in the Z-direction $V_{V,Y}$ is calculated as:

$$V_{V,Z} = \frac{E_A^* \omega_Z}{|\Delta U_Z|},$$

where $\omega_Z$ is the z-axis resonant frequency and the difference $\Delta U_Z$ is defined as:

$$\Delta U_Z = \frac{(Z_E - Z_C)}{\sqrt{(X_E - X_C)^2 + (Y_E - Y_C)^2 + (Z_E - Z_C)^2}} - \frac{(Z_C - Z_B)}{\sqrt{(X_C - X_B)^2 + (Y_C - Y_B)^2 + (Z_C - Z_B)^2}}.$$

For some applications, the resonant frequencies for all of the axes will equal the same resonant frequency ω. In this case, since tolerable error allowance $E_A$ and resonant frequency ω are both constant variables, the product of tolerable error allowance $E_A$ and resonant frequency ω can be replaced by a single constant variable in a computer code implementing the vertex velocity calculations to reduce the overall number of computations made by robotic system 10.

Once the vertex velocities are calculated for each direction, the overall vertex velocity $V_V$ is set to the smallest of the vertex velocities in each direction $V_{V,X}$, $V_{V,Y}$, and $V_{V,Z}$. (Box 52, FIG. 6). It is noted that the above calculations are intended for a tri-axial robotic system and that the calculations can be extended to an arbitrary number of axis that need not be orthogonal to each other. In a system where the X-axis is coupled to the Y-axis, and where both the X-axis and the Y-axis are independent of the Z-axis, the overall vertex velocity $V_V$ is set to the smallest of vertex velocity in the x-direction $V_{V,X}$ and the vertex velocity in the y-direction $V_{V,Y}$.

Robotic system 10 allows tool 16 to travel at variable speeds not exceeding a maximum velocity denoted as steady-state velocity $V_{SS}$. Accordingly, computed vertex velocities $V_V$ that exceed steady-state velocity $V_{SS}$ must be reduced to equal steady-state velocity $V_{SS}$. (Box 54, FIG. 6). The vertex velocity equations show that for small deflection angles α, difference ΔU will be small and vertex velocity $V_V$ will be infinitely large. Conversely, the vertex velocity equations show that for large deflection angles α, difference ΔU will be large and vertex velocity $V_V$ will be small.

The above calculations for vertex velocity $V_V$ are used to keep oscillations caused by a change in momentum of tool 16 at a vertex below the tolerable error allowance $E_A$. Additional steps must be taken to keep oscillations caused by the resonating of tool 16 below the tolerable error allowance $E_A$.

The frequency at which tool 16 proceeds through a series of vertices is inversely related to the time it takes tool 16 to travel through the series of vertices. Hence, to detect potential resonance, the move-compiler can calculate the amount of time it will take for tool 16 to travel between vertices, rather than frequency at which tool 16 proceeds through vertices. The time between vertices is dependent upon the velocity at which tool 16 moves along predefined path 20.

Typically, the velocity at which tool 16 travels between vertices is controlled by controller 14 according to a relationship defined by a nonresonant velocity profile. The nonresonant velocity profile applies between nonresonant vertices and allows for the velocity of tool 16 to reach the maximum velocity of tool 16, steady-state velocity $V_{SS}$.

In a first example of a nonresonant velocity profile, controller 14 moves tool 16 along each straight-line segment of the path by linearly accelerating or decelerating tool 16 from the vertex velocity at the first-reached vertex along the path to the vertex velocity at the next-reached vertex along the path. In this first example, if the vertex velocities $V_V$ of two neighboring vertices were equal, the velocity of tool 16 would remain constant while traveling between those two neighboring vertices.

In a second example of a nonresonant velocity profile, the velocity of tool 16 is alternatively accelerated toward the steady-state velocity $V_{SS}$ (or an intermediate velocity $V_I$ if the straight-line segment tool 16 is traveling along is too short for the velocity to reach $V_{SS}$) and decelerated toward either zero velocity or the vertex velocity $V_V$ of the next vertex, if necessary. This second example of a nonresonant velocity profile is described in detail in co-pending application, which is hereby incorporated by reference as if set forth fully herein, entitled "Rapid Prototyping System with Exponential Velocity Profile" and filed on equal date with this application.

A vertex is identified as a resonant vertex if that vertex has a neighboring vertex for which the following error that results when tool 16 travels through that vertex and its neighboring vertex (i.e., negotiates the pair of vertices) at their associated vertex velocities might exceed the tolerable error allowance. (Boxes 32 and 34, FIGS. 5 and 6). Accordingly, the assigned vertex velocity of an identified resonant vertex is reduced so that the following error that results when tool 16 negotiates the vertex and its neighboring vertices is less than the tolerable error allowance. (Box 36, FIGS. 5 and 6).

To detect resonance that will cause the following error of tool 16 to exceed the tolerable error allowance, each of the vertices is first classified as either a suspect vertex or a non-suspect vertex. Second, each of the suspect vertices is evaluated to determine if that suspect vertex is a resonant vertex. Third, the vertex velocities $V_V$ at resonant vertices and maximum segment velocities between closely-neighboring resonant vertices are adjusted. Finally, those vertices lying between closely-neighboring resonant vertices are reclassified as resonant vertices.

Step One: Classifying All Vertices as Either Suspect or Non-Suspect Vertices

Based upon the calculated set of vertex velocities $V_V$, the move-compiler classifies each vertex as either a suspect vertex or a non-suspect vertex. (Box 56, FIG. 6). A non-suspect vertex is a vertex for which vertex velocity $V_V$ is in excess of a predefined high-limit velocity $V_{V,HIGH}$. The high-limit velocity $V_{V,HIGH}$ is established by trial and error such that, for a particular robotic system 10, all vertices having an associated vertex exceeding the high-limit velocity $V_{V,HIGH}$ will be presumptively nonresonant.

Accordingly, non-suspect vertices are those vertices in which the force required to alter the heading of tool 16 at that vertex is insufficient to cause tool 16 to resonate since the deflection angle $\alpha$ at that vertex is relatively small. In contrast, a suspect vertex is one in which vertex velocity $V_V$ is less than high-limit velocity $V_{V,HIGH}$. (Box 58, FIG. 6). It is noted that for rapid prototyping applications, the above assumptions are demonstratively accurate; however, it may be necessary in other applications to treat all vertices, regardless of their associated vertex velocity, as suspect vertices.

Step 2: Identifying Resonant Vertices

The move-compiler next examines each of the suspect vertices to determine whether they are resonant vertices. If two neighboring vertices are both suspect vertices, the move-compiler computes a tool travel time for tool 16 to travel between those two neighboring vertices, according to non-resonant velocity profiling. (Box 60, FIG. 6). The move-compiler compares this tool travel time to a resonance window period $T_{RES}$, which is comparable to the settling time of a damped second order system. (Box 62, FIG. 6). Neighboring suspect vertices that have a tool travel time between them that is less than the resonance window period $T_{RES}$ are classified by the move-compiler as resonant vertices. (Box 34, FIGS. 5 and 6). A suspect vertex whose neighboring vertices are both non-suspect vertices are not classified as a resonant vertex at this step.

It is noted that if the settling time of individual axes differ from each other, the settling time of the most under-damped axis should be used as the resonance window period $T_{RES}$ in this preferred embodiment. In an alternate embodiment, the selection of the resonance window period $T_{RES}$ can be made with respect to the settling time of the axis that is most likely the dominant contributor to the following error.

Step 3: Reduce Vertex Velocities, If Necessary

Next, the move-compiler examines each resonant vertex to determine if the vertex velocity $V_V$ associated with that vertex should be adjusted. (Box 36, FIGS. 5 and 6). If the associated vertex velocity $V_V$ exceeds a pre-defined low-limit velocity $V_{V,LOW}$, controller 14 reduces the associated vertex velocity $V_V$ to equal a value not exceeding the low-limit velocity $V_{V,LOW}$, and more preferably, to equal the low-limit velocity $V_{V,LOW}$. (Boxes 64 and 66, FIG. 6). The low-limit velocity $V_{V,LOW}$ is determined by trial and error, such that if tool 16 of a particular robotic system 10 were traveling at a velocity less than the low-limit velocity $V_{V,LOW}$, any oscillations caused by tool 16 resonating would be contained within the tolerable error allowance $E_A$.

Step 4: Reduce Segment Velocities, If Necessary

Once the move-compiler establishes which vertices are resonant vertices and reduces the necessary vertex velocities $V_V$, it determines the tool travel time between pairs of resonant vertices when applying non-resonant velocity profiling. If the time separating two resonant vertices is less than resonance window period $T_{RES}$, resonant velocity profiling is applied between those resonant vertices. (Boxes 40 and 46, FIG. 5). Resonant velocity profiling applies between closely neighboring resonant vertices and limits the maximum velocity of tool 16 to the low-limit velocity $V_{V,LOW}$.

As with non-resonant velocity profiling, there are many different resonant velocity profiles that can be applied. For instance, tool 16 can be moved along each straight-line segment of the path by being linearly accelerated or decelerated from the vertex velocity $V_V$ associated with the first-reached vertex along the path to the vertex velocity $V_V$ associated with the next-reached vertex along the path. Also, the velocity of tool 16 can alternatively be accelerated toward the low-limit velocity $V_{VLOW}$ (or an intermediate velocity if the straight-line segment tool 16 is traveling along is too short for its velocity to reach the low-limit velocity $V_{VLOW}$) and decelerated toward either zero or the vertex velocity $V_V$ of the next vertex. In addition, since resonant velocity profiling applies only between closely-neighboring resonant vertices, the velocity of tool 16 can be held constant at a value; for example, the velocity of tool 16 can be held equal to low-limit velocity $V_{VLOW}$.

Note that non-resonant profiling applies between two neighboring resonant vertices when the time it takes for tool 16, according to non-resonant velocity profiling, to travel between those two resonant vertices exceeds resonance window period $T_{RES}$.

Step 5: Reclassify Vertices as Resonant, If Necessary

Finally, if the move-compiler determines that the time it will take for tool 16 to travel, according to non-resonant velocity profiling, between any two resonant vertices is less than resonance window period $T_{RES}$, the move-compiler reclassifies all non-resonant vertices that lie between the two resonant vertices as resonant vertices. (Box 42, FIG. 5). Accordingly, vertex velocities $V_V$ that exceed the low-limit velocity $V_{VLOW}$ and are associated with the newly reclassified resonant vertices are reduced to equal a value not exceeding the low-limit velocity $V_{VLOW}$. (Box 44, FIG. 5). In addition, resonant velocity profiling is applied between the pair of resonant vertices, and between each of the newly-reclassified resonant vertices located between the pair. (Box 46, FIG. 5).

In summary, robotic system 10 of the present invention computes, for a given non-resonant velocity profile and set of vertex velocities $V_V$, a tool travel time required for tool 16 to travel between pairs of vertices. If these travel time calculations indicate that tool 16 is approaching its natural frequency ω, controller 14 reduces the velocity at which tool 16 is traveling to prevent it from reaching that natural frequency ω.

In the preferred embodiment described above, a worst case assumption is made that the resultant oscillations from a momentum impulse when tool 16 negotiates a vertex will add coherently and constructively to the resultant oscillations from a momentum impulse when tool 16 negotiated a previous vertex. An alternative embodiment would test whether the above worst case assumption should apply. Accordingly, an additional calculation would be performed in Step 2 to determine whether the resultant oscillations from negotiating a first vertex are coherent and destructive to the resultant oscillations from negotiating a subsequent vertex. If the oscillations are coherent and constructive, the worst case assumption is applied, otherwise, the vertices are classified as non-resonant vertices. The coherence time is the time for which the phase of an oscillation is predictable because the frequency is sufficiently well known.

In an additional alternative embodiment, in Step 2, the following error contributions of all vertices within the resonance window period $T_{RES}$ of each other are accumulated. If the accumulate following error exceeds the allowable error allowance $E_A$, each of those vertices is classified as resonant vertex.

It is pointed out that the resonant resolution steps of the present invention may be applied to any given set of vertex velocities. Calculation of the vertex velocities in the manner set forth herein is by way of preferred example. The resonance resolution steps may be applied for instance where a single constant velocity is initially assigned to each vertex.

As is noted above, the teaching of this invention can be applied with advantage in any robotic system where performance is determined by navigating a complex path precisely and quickly. The teaching of this application is, for example, particularly advantageous in a rapid prototyping system of the type described in the co-pending application entitled "Rapid Prototyping System with Exponential Velocity Profile" and filed on equal date with this application, and incorporated herein.

Although the present invention has been described with reference to preferred embodiments, workers skilled in the art will recognize that changes may be made in form and detail without departing from the spirit and scope of the invention.

We claim:

1. A method for controlling a following error in a robotic system that moves a tool at a velocity along a predefined path defined by an inputted set of vertices, each of the vertices in the inputted set of vertices having an assigned vertex velocity, the following error being controlled to be less than a tolerable error allowance, the method comprising:

identifying a subset of resonant vertices from the inputted set of vertices, the resonant vertices each having a neighboring vertex for which a following error that results when the tool negotiates both the vertex and its neighboring vertex at the assigned vertex velocities might exceed the tolerable error allowance; and assigning a reduced vertex velocity to each vertex in the subset of resonant vertices, the reduced vertex velocity being selected so that the following error that results when the tool negotiates both the vertex and its neighboring vertex at the reduced vertex velocities is less than the tolerable error allowance.

2. The method of claim 1 and further comprising:

identifying pairs of resonant vertices from the subset of resonant vertices for which a tool travel time between the pair of resonant vertices is less than a resonance window period when the velocity of the tool is controlled according to a nonresonant velocity profile; and reclassifying as resonant vertices those vertices that lie between the identified pairs of resonant vertices.

3. The method of claim 2 and further comprising:

controlling the velocity of the tool according to a resonant velocity profile when traveling between the identified pairs of resonant vertices with a resonant velocity profile.

4. The method of claim 1 wherein the reduced vertex velocities are reduced to a value not in excess of a low-limit velocity.

5. The method of claim 1 wherein the reduced vertex velocities are reduced to equal a low-limit velocity.

6. A method for controlling a following error in a robotic system that moves a tool at a velocity along a predefined path defined by an inputted set of vertices, the following error being controlled to be less than a tolerable error allowance, the method comprising:

assigning a vertex velocity to each vertex, the vertex velocity being selected so that the resultant following error when the tool negotiates the vertex at its assigned vertex velocity is less than the tolerable error allowance;

identifying a subset of resonant vertices from the inputted set of vertices, the resonant vertices each having a neighboring vertex for which the resultant following error when the tool negotiates both the vertex and its neighboring vertex at the assigned vertex velocities might exceed the tolerable error allowance; and assigning a reduced vertex velocity to each vertex in the subset of resonant vertices, the reduced vertex velocity being selected so that the resultant following error when the tool negotiates both the vertex and its neighboring vertex at the reduced vertex velocities is less than the tolerable error allowance.

7. The method of claim 6 and further comprising:

identifying pairs of resonant vertices from the subset of resonant vertices for which a tool travel time between the pair of resonant vertices is less than a resonance window period when the velocity of the tool is controlled according to a nonresonant velocity profile; and reclassifying as resonant vertices those vertices that lie between the identified pairs of resonant vertices.

8. The method of claim 7 and further comprising:

controlling the velocity of the tool according to a resonant velocity profile when traveling between the identified pairs of resonant vertices with a resonant velocity profile.

9. The method of claim 6 wherein the reduced vertex velocities are reduced to a value not in excess of a low-limit velocity.

10. The method of claim 6 wherein the reduced vertex velocities are reduced to equal a low-limit velocity.

11. A method for detecting and resolving resonance in a robotic system that moves a tool at a velocity along a predefined path defined by an inputted set of vertices, each of the vertices having a vertex velocity associated with it, the method comprising:

identifying a subset of resonant vertices from the inputted set of vertices; and reducing the vertex velocities that both exceed a predefined low-limit velocity and are associated with identified resonant vertices.

12. The method of claim 11 and further comprising:

identifying pairs of resonant vertices from the subset of resonant vertices for which a tool travel time between the pair of resonant vertices is less than a resonance window period when the velocity of the tool is controlled according to a nonresonant velocity profile; and reclassifying as resonant vertices those vertices that lie between the identified pairs of resonant vertices.

13. The method of claim 12 and further comprising:

controlling the velocity of the tool according to a resonant velocity profile when traveling between the identified pairs of resonant vertices with a resonant velocity profile.

14. The method of claim 11 wherein the reduced vertex velocities are reduced to a value not in excess of the low-limit velocity.

15. The method of claim 11 wherein the reduced vertex velocities are reduced to equal the low-limit velocity.

16. A method for detecting and resolving resonance in a robotic system that moves a tool a velocity along a predefined path defined by an inputted set of vertices, each of the vertices having a vertex velocity associated with it, the method comprising:

identifying a subset of suspect vertices from the inputted set of vertices;

identifying a subset of resonant vertices from the subset of suspect vertices;

adjusting vertex velocities that both exceed the low-limit velocity and are associated with identified resonant vertices;

identifying pairs of resonant vertices from the subset of resonant vertices for which a tool travel time between the pair of resonant vertices is less than a resonance window period when the velocity of the tool is controlled according to a nonresonant velocity profile;

reclassifying as resonant vertices those vertices in the inputted set of vertices that lie between the identified pairs of resonant vertices; and controlling movement of the tool according to a resonant velocity profile when traveling between the identified pairs of resonant vertices.

17. The method of claim 16 wherein the adjusted vertex velocities are adjusted to equal a value not in excess of the low-limit velocity.

18. The method of claim 16 wherein the adjusted vertex velocities are adjusted to equal the low-limit velocity.

19. A method for controlling movement of a tool in a robotic system that moves the tool at a velocity along a path defined by an inputted set of vertices, the method comprising:

assigning a vertex velocity for each of the inputted vertices;

identifying a subset of resonant vertices from the inputted set of vertices;

reducing the vertex velocity associated with each identified resonant vertex having an associated vertex velocity that exceeds a predefined low-limit velocity; and controlling movement of the tool based upon the reduced vertex velocities associated with each vertex in the inputted set of vertices.

20. The method of claim 19 wherein the step of calculating a vertex velocity for each of the inputted vertices comprises:

calculating a dimensional vertex velocity for each axis in the robotic system;

setting the vertex velocity associated with each vertex to the smallest of the dimensional vertex velocities associated with that vertex; and reducing vertex velocities in excess of a steady-state velocity to equal the steady-state velocity.

21. The method of claim 19 wherein the step of identifying a subset of resonant vertices from the inputted set of vertices comprises:

identifying a subset of suspect vertices from the inputted set of vertices;

identifying an initial subset of resonant vertices from the subset of suspect vertices;

identifying pairs of resonant vertices from the initial subset of resonant vertices for which a tool travel time between the pair of resonant vertices is less than a resonance window period when the velocity of the tool is controlled according to a nonresonant velocity profile; and reclassifying as resonant vertices those vertices in the inputted set of vertices that lie between the identified pairs of resonant vertices.

22. The method of claim 19 wherein the reduced vertex velocities are reduced to equal a value less than the low-limit velocity.

23. The method of claim 19 wherein the reduced vertex velocities are reduced to equal the low-limit velocity.

* * * * *